US012632093B2

(12) United States Patent
Salvat Lozano et al.

(10) Patent No.: US 12,632,093 B2
(45) Date of Patent: May 19, 2026

(54) ENERGY CONSUMPTION OPTIMIZATION IN DIGITAL TWIN APPLICATIONS

(71) Applicant: NEC Laboratories Europe GmbH, Heidelberg (DE)

(72) Inventors: Josep Xavier Salvat Lozano, Heidelberg (DE); Xi Li, Heidelberg (DE); Lanfranco Zanzi, Heidelberg (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 268 days.

(21) Appl. No.: 18/342,780

(22) Filed: Jun. 28, 2023

(65) Prior Publication Data

US 2024/0319774 A1      Sep. 26, 2024

Related U.S. Application Data

(60) Provisional application No. 63/453,174, filed on Mar. 20, 2023.

(51) Int. Cl.
G06F 1/26 (2006.01)
(52) U.S. Cl.
CPC .................................... G06F 1/26 (2013.01)
(58) Field of Classification Search
CPC ........................................................ G06F 1/26
See application file for complete search history.

(56) References Cited

U.S. PATENT DOCUMENTS 11,283,863 B1 * 3/2022 Cleaver ................... H04L 67/10
2016/0333854 A1 * 11/2016 Lund ....................... F03D 7/042
(Continued)

FOREIGN PATENT DOCUMENTS

CN          112181382 B     8/2021
CN          115412956 A     11/2022
(Continued)

OTHER PUBLICATIONS

Ahmed, Quazi Warisha et al.; "AI-Based Resource Allocation Techniques in Wireless Sensor Internet of Things Networks in Energy Efficiency with Data Optimization"; *Electronics—Intelligent Distributed Resource Allocation in Wireless Sensor Networks (WSNs)*; Jul. 1, 2022; pp. 1-13; vol. 11, No. 2071; MDPI; Basel, Switzerland.

(Continued)

*Primary Examiner* — Phil K Nguyen

(74) *Attorney, Agent, or Firm* — Leydig, Voit & Mayer, Ltd.

(57)          ABSTRACT

A computer-implemented method for optimizing energy consumption of a digital twin system. A plurality of input metrics are received for each of a plurality of digital twins implemented in the digital twin system, the input metrics including sensor data from a plurality of corresponding physical counterparts of the digital twins. An updated configuration is determined for each of the plurality of digital twins based on context information of the digital twins, each updated configuration including at least one of an updated radio configuration, computing configuration, and digital twin configuration that reduces a power consumption of the digital twin system. Each updated configuration is provided to at least one of a radio application programming interface (API), computing API, and digital twin configuration API.

15 Claims, 7 Drawing Sheets

(56) References Cited

U.S. PATENT DOCUMENTS

| | | | |
|---|---|---|---|
| 2017/0286572 A1* | 10/2017 | Hershey | B64F 5/60 |
| 2019/0294975 A1* | 9/2019 | Sachs | H04W 56/00 |
| 2020/0259896 A1 | 8/2020 | Sachs et al. | |
| 2021/0118067 A1* | 4/2021 | Muenz | G05B 15/02 |
| 2021/0133599 A1* | 5/2021 | Reineke | G06N 5/04 |
| 2022/0100171 A1* | 3/2022 | Miller | G06N 20/00 |
| 2022/0163959 A1 | 5/2022 | Cella et al. | |
| 2022/0187847 A1 | 6/2022 | Cella et al. | |
| 2022/0390997 A1 | 12/2022 | Hendriks et al. | |
| 2022/0413989 A1* | 12/2022 | Karri | G06F 9/5027 |
| 2023/0026782 A1 | 1/2023 | Sha et al. | |
| 2023/0236871 A1* | 7/2023 | Marzorati | G06F 30/27 |
| | | | 718/100 |
| 2024/0103504 A1* | 3/2024 | Batcher | G05B 19/41885 |
| 2024/0242008 A1* | 7/2024 | Mene | G06F 30/27 |
| 2024/0272595 A1* | 8/2024 | Montestruque | G06Q 10/0633 |

FOREIGN PATENT DOCUMENTS

| | | | |
|---|---|---|---|
| JP | 2022/183887 A | 12/2022 | |
| WO | WO 2021/201823 A1 | 10/2021 | |
| WO | WO 2022/134732 A1 | 6/2022 | |

OTHER PUBLICATIONS

Clausen, Anders et al.; "A digital twin framework for improving energy efficiency and occupant comfort in public and commercial buildings"; *Energy Informatics*; Sep. 24, 2021; pp. 1-19; vol. 4, Suppl. 2, No. 40; Springer Open Access; London, UK.

Girletti, Luigi et al.; "An Intelligent Edge-based Digital Twin for Robotics"; *2020 IEEE Globecom Workshops (GC Wkshps*; Mar. 5, 2021; pp. 1-6; IEEE; Piscataway, NJ, USA.

Groshev, Milan et al.; "Dissecting the Impact of Information and Communication Technologies on Digital Twins as a Service"; *IEEE Access*; Jul. 19, 2021; pp. 102862-102876; vol. 9; IEEE; Piscataway, NJ, USA.

Nair, Divya R. et al.; "A Smart Microgrid System with Artificial Intelligence for Power-Sharing and Power Quality Improvement"; *Energies*; Jul. 27, 2022; pp. 15; vol. 15, No. 5409; MDPI; Basel, Switzerland.

Shen, Xuemin et al.; "Holistic Network Virtualization and Pervasive Network Intelligence for 6G"; *IEEE Communications Surveys & Tutorials*; Jan. 2, 2023; pp. 1-30; vol. 24, No. 1; ArXiv.org, Cornell University; Ithaca, NY, USA.

* cited by examiner

702 — Processor(s)

704 — Memory

706 — I/O

708 — Sensor(s)

710 — UI(s)

712 — Actuator(s)

700

ENERGY CONSUMPTION OPTIMIZATION IN DIGITAL TWIN APPLICATIONS

CROSS-REFERENCE TO RELATED APPLICATIONS

Priority is claimed to U.S. Provisional Patent Application No. 63/453,174, filed on Mar. 20, 2023, the entire disclosure of which is hereby incorporated by reference herein.

FIELD

The present invention relates to a method, controller, system and computer-readable medium for optimizing energy consumption and/or other performance parameters in industrial twin applications deployed in a radio network, in particular a local 5G network.

BACKGROUND

Digital twins are virtual representations of a physical product, system, and/or process and can be used in a variety of industries and applications. The virtual representation serves as a digital counterpart of a real-world product, system and/or process to facilitate various purposes, including simulation, integration, testing, monitoring, and maintenance. Digital twin implementations have varying degrees of complexity, time-sensitivity to responding to real-time data, and data traffic volumes. Maintenance of an accurate digital twin or system of digital twins is important to ensure physical counterparts are monitored and/or operated as intended.

SUMMARY

In an embodiment, the present invention provides a computer-implemented method for optimizing energy consumption of a digital twin system. A plurality of input metrics are received for each of a plurality of digital twins implemented in the digital twin system, the input metrics including sensor data from a plurality of corresponding physical counterparts of the digital twins. An updated configuration is determined for each of the plurality of digital twins based on context information of the digital twins, each updated configuration including at least one of an updated radio configuration, computing configuration, and digital twin configuration that reduces a power consumption of the digital twin system. Each updated configuration is provided to at least one of a radio application programming interface (API), computing API, and digital twin configuration API.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
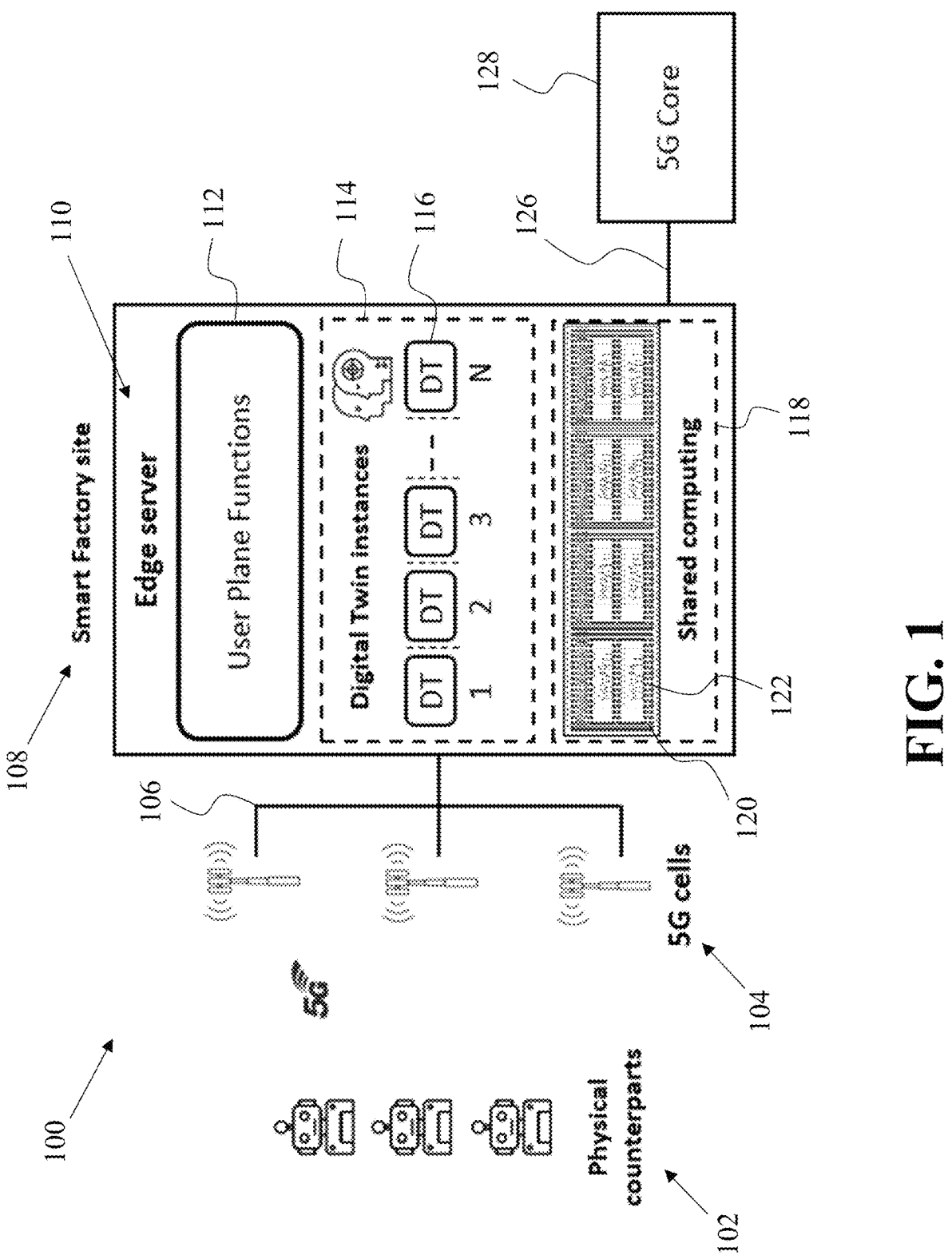
FIG. 1 illustrates a model of different digital twins in a smart factory.

In an embodiment, the present invention provides a controller that optimizes digital twin configurations in industrial applications jointly with its radio and computing resource allocation to minimize energy consumption. Embodiments of the invention reduce the energy consumption of a smart factory using digital twins by leveraging the delay budget of one or more digital twins. This allows deployment of digital twin systems on a larger and/or wider scale, as power limitations may otherwise preclude deployment of larger digital twin systems that consume too much power. This also enables deployment of digital twin systems in power-scarce applications, where even small scale digital twin systems would previously be unable to operate. Digital twin systems that don't necessarily exceed power limits are also improved, as optimized power consumption also reduces costs to operate a digital twin system. Where a smart factory or other application implements several digital twins in a similar infrastructure, energy savings are compounded by the collective power consumption reduction of individual digital twins and/or digital twin systems.

While embodiments of the present invention are been described in terms of optimizing or decreasing system energy consumption, it will be readily appreciated that improvements to other parameters of smart factory systems may likewise be achieved within embodiments of the present invention. For example, parameters such as processing time, operation speed, and computational load may similarly be optimized in accordance with the embodiments of the present invention.

Embodiments of the present invention also provide improved computational efficiency over known digital twin systems, as computational resources are utilized to their fullest when required to meet the full demands of one or more digital twins, but also allowed to operate leanly over a longer period of time when the delay budget of one or more digital twins allows. As such, embodiments of the present invention also provide increased flexibility for digital twin applications. For example, where a digital twin system may have previously been customized for a more narrow subset of applications owing to the computational resources needing to meet a static minimum computational requirement, embodiments of the present invention provide digital twin systems that are able to accommodate dynamic computational resource control across a wider range of applications. Embodiments of the present invention also improve the accuracy of digital twin representations and simulations by allocating computational resources where necessary to facilitate processing of greater quantities of data.

As 5G develops, its innovations open the door to enhancing existing businesses and developing new applications.

Industrial organizations are slowly adopting new 5G developments. The ability to quickly deploy, customize and automate services and applications enables production process digitalization, thereby enabling improved industrial efficiency while enhancing cost and energy savings. However, in order unlock potential benefits of 5G developments for industrial applications, software-enabled and virtualized solutions are needed to adapt existing technology and current systems to benefit from features such as private on-site networks, network slicing, and low latency communications, among others.

One practical application for future smart industry is a digital twin service. A digital twin integrates physical and virtual worlds through monitoring, computing, and communication technologies. A digital twin is a virtual representation that serves as the real-time digital counterpart of a physical process or entity. Digital twins use sensor data collected on the physical site and historical data to build a real-time digital simulation. A digital twin service is especially advantageous for monitoring, fault detection, diagnosis, and prognosis to optimize performance and utilization of industrial processes. Digital twins have many applications in different technological areas. For example:

1. A digital twin can be used as a digital representation of robotic arms performing different tasks, such as movement or building operations over different materials.

process the sensor data and perform corresponding operations. Monitoring-oriented digital twins have a relatively high time budget to process sensor data from their physical counterparts, as they perform basic monitoring operations. However, simulation-oriented digital twins must compute and update the state of the objects they mirror using a smaller time budget, given the need for a real-time representation of the physical counterpart they are mirroring. The time budget is even smaller when using operational-oriented digital twins, as they manage the control logic of the physical objects and need to run in nearly real-time.

Therefore, data processing has a different time budget depending on the type and operation the digital twins carry out. Depending on the operations and the application requirements, the digital twins can be either more elastic, meaning its delay budget is high or its operations can be delayed, or inelastic, meaning its delay budget is low and/or cannot tolerate delay. Accordingly, elastic digital twins are tolerant to delays and allow delaying operations. In contrast, inelastic digital twins might put themselves in an out-of-sync state if they do not complete operations in time. Inelastic digital twins might only work if the operations are timely, as they cannot guarantee that their operation is coherent with real counterparts if they suffer a high delay. The following Table 1 summarizes some exemplary requirements for each type of digital twin.

TABLE 1

| Digital Twin | Latency | Data Rate | Reliability | Scalability |
|---|---|---|---|---|
| Monitoring | 50-100 ms | 0.1-0.5 Mbps | 99.9% | 100-1000 nodes |
| Simulation | 20-50 ms | 1-1000 Mbps | 99.99% | 1-100 nodes |
| Operation | 0.5-20 ms | 1-100 Mbps | 99.9999% | 1-50 nodes |

2. A digital twin can also be used for three-dimensional (3D) modelling of the output production parts from computer numerical control (CNC) machines so that the outputs are compliant with expected blueprints.

3. Digital twins also have applications to provide improvements in the field of autonomous vehicles so that automotive applications can be easily developed and tested.

Digital twin services can be classified into three different classes:

1. Monitoring: Digital twins process sensor data received from the physical objects they mirror and perform operations such as anomaly or error detection or performance prediction.

2. Simulation: Digital twins process sensor data received from the physical objects to create and simulate a digital representation of its physical counterpart. This is particularly advantageous to improve technical processes such as process debugging and system or resource planning.

3. Operational: Digital twins not only process sensor data to simulate the state of a physical object but also provide control for their physical counterparts. The digital twins run the main logic of the physical objects, sending different control commands to accomplish specific tasks and process feedback data from the physical object. Thus, the main control logic does not run in the physical robot itself but rather in the digital twin, which is usually placed in an edge-computing server.

Generally speaking, digital twins are latency-sensitive applications. The more involved a digital twin is with the control of its physical object, the less time budget it has to Without loss of generality, the computational resource demands of each digital twin depends on different parameters. For starters, digital twins receive different types and amounts of sensor data that they have to process depending on their physical counterparts. For instance, images from a robot's camera might have a higher computational demand than data from a position sensor. Additionally, computational resource demands at the digital twin side depend on the tasks the physical objects carry out and on the model update frequency. Operational digital twins usually need to update the model frequently and constantly, while monitoring digital twins have more relaxed computational constraints. A robot doing a coarse-grained task receives a fewer number of commands and returns less sensing data to its digital twin counterpart, which translates into updating the simulation model less frequently. Conversely, a robot performing high-precision critical tasks needs to receive many control commands operating small movements, and returns a more significant amount of sensing data to the digital twin to close the feedback loop. Due to latency constraints, digital twins are usually deployed in an edge server closely located to the physical objects that will be monitored, simulated or emulated. However, it is possible to place them on a far-edge server or a cloud server further away as long as they comply with the service latency requirements. The computational resource demands also depend on the computational needs of other digital twins deployed into the same infrastructure. This so-called noisy neighbor problem can also increase the computational resource demand of each digital twin as they might interfere with each other.

A first aspect of the present invention provides a computer-implemented method for optimizing energy consumption of a digital twin system comprising receiving a plurality of input metrics for each of a plurality of digital twins implemented in the digital twin system, the input metrics including sensor data from a plurality of corresponding physical counterparts of the digital twins. The method also comprises determining an updated configuration for each of the plurality of digital twins based on context information of the digital twins, each updated configuration including at least one of an updated radio configuration, computing configuration, and digital twin configuration that reduces a power consumption of the digital twin system. The method also comprises providing each updated configuration to at least one of a radio application programming interface (API), computing API, and digital twin configuration API.

According to a second aspect, the present invention provides the method according to the first aspect and further comprises training a common model with a feedback signal. The feedback signal indicates the power consumption of the digital twin system and whether a delay budget for each of the plurality of physical counterparts corresponding to the plurality of digital twins is met or exceeded.

According to a third aspect, the present invention provides the method according to the first or second aspect, wherein the delay budget corresponds to a latency period during which operation of a physical counterpart to a digital twin can be delayed.

According to a fourth aspect, the present invention provides the method according to any of the first to third aspects, wherein each of the plurality of digital twins is associated with a different agent. Each agent is configured to determine actions of the digital twin with which the agent is associated and to provide the updated configuration to at least one of the radio API, computing API, and digital twin configuration API of the associated digital twin.

According to a fifth aspect, the present invention provides the method according to any of the first to fourth aspects, wherein each agent is configured to use the common model to determine the actions of its associated digital twin such that the agents learn to collaborate with each other.

According to a sixth aspect, the present invention provides the method according to any of the first to fifth aspects, wherein the receiving of the plurality of input metrics occurs at the beginning of a decision interval and the feedback signal is used to train the common model at the end of the decision interval. Each step of the method is repeated iteratively over a plurality of discrete decision intervals.

According to a seventh aspect, the present invention provides the method according to any of the first to sixth aspects, wherein determining the updated radio configuration includes determining at least one of a wireless transmission airtime of data from the plurality of physical counterparts to a wireless receiver and a modulation coding scheme that reduces the power consumption of the digital twin system.

According to an eighth aspect, the present invention provides the method according to any of the first to seventh aspects, wherein determining the updated digital twin configuration includes determining at least one of a sampling frequency, command rate, and activation status of a sensor of each of the plurality of physical counterparts that reduces the power consumption of the digital twin system.

According to a ninth aspect, the present invention provides the method according to any of the first to eighth aspects, wherein determining the updated computing configuration includes determining at least one of a computing core set allocation and L3 cache line allocation for each of the plurality of digital twins that reduces the power consumption of the digital twin system.

According to a tenth aspect, the present invention provides the method according to any of the first to ninth aspects, wherein the context information is determined using the input metrics and includes a vector indicating at least one of a sensor type, a sensor bitrate, a sensor activation status, a type of the respective digital twin, and a latency budget of the respective digital twin.

According to an eleventh aspect, the present invention provides the method according to any of the first to tenth aspects, wherein the sensor data from the plurality of physical counterparts includes at least one of the sensor type, the sensor bit rate, and the sensor activation status. The context information and actions of the digital twins are embedded using a common embedding function and used by a common model. Each digital twin is associated with an agent that determines the actions of its associated digital twin, and the common model is used by each of the agents to determine the actions such that the agents learn to collaborate.

According to a twelfth aspect, the present invention provides the method according to any of the first to eleventh aspects, wherein the context information for each of the digital twins is embedded into a common embedding space to obtain variable context information for each of the digital twins in a fixed-length vector, and wherein the common model receives a common feedback signal for the digital twins.

According to a thirteenth aspect, the present invention provides the method according to any of the first to twelfth aspects, wherein the radio API is configured to define parameters for a local 5G network, and wherein the plurality of digital twins and the plurality of physical counterparts are configured to communicate via the local 5G network.

In a fourteenth aspect, the present invention provides a controller for a digital twin system, the digital twin system including an edge server. A plurality of digital twins are stored in a memory. The digital twins correspond to digital models representing physical counterparts, and one or more wireless communication cells are configured to receive sensor data from one or more sensors of each of the physical counterparts, the controller comprising one or more processors, which alone or in combination, are configured to provide for execution of the method according to any of the first to thirteenth aspects.

In a fifteenth aspect, the present invention provides a non-transitory computer-readable medium having processor-executable instructions stored thereon, wherein the processor-executable instructions, when executed by one or more processors, facilitate performance of the method according to any of the first to thirteenth aspects.

FIG. 1 shows a digital twin system 100 with different digital twin instances $DT_{1,2,3\ldots N}$ 116 in a smart factory 108. The smart factory 108 includes an edge server 110, which may be implemented as an on-site server or as cloud-based remote server with which the smart factory 108 communicates. The edge server 110 includes one or more user plane functions 112 implemented as computer readable instructions stored in memory. The user plane function 112 is a component of a 5G architecture designed to enable edge computing applications. Specifically, because control and user (data) planes are split in a 5G architecture, user plane functionality can be delivered flexibly at an edge as well as at the network core (e.g., 5G core 128). The user plane function 112 is responsible for handling user data and forwarding it between various network nodes. The user plane functions 112 forwards and routes traffic from users so that edge applications can be enabled without having to first pass through the network core. The edge server 110 also includes one or more digital twin implementations 114, each of which include individual digital twins 116 that virtually represent real-world physical counterparts 102. The edge server 110 also includes a shared computing core network 118. The edge server 110 deploys the user plane function 112, which is responsible for delivering user data between user equipment and the core network 118. The user plane function 112 acts as a packet-forwarding node in a 5G data plane. The user plane function 112 receives and forwards data to the different digital twins 116 deployed in the edge server 110, and the digital twins 116 perform the corresponding operations depending on the type of digital twin deployed.

The core network 118 includes a plurality of physical cores 120, each of which includes a plurality of cores 124. The physical cores 120 represent physically modular cores that can be substituted for one another or replaced. For example, if one of the plurality of physical cores 120 fails, it may be removed and replaced by a fully functional and dimensionally identical or similar physical core 120. Physical cores 120 may be implemented, for example, as processing units inserted within a processing unit socket specifically configured for a particular shape and/or type of processing unit. Each of the physical cores 120 includes a multicore processor, and each physical core 120 thus includes a plurality of computing cores 122. The physical cores 120 are configured as a core network 118 so that computing loads experienced by the edge server 110 may be distributed among the physical cores 120 and their computing cores 122 in an optimal manner, as will be described in greater detail hereafter. As an illustrative example, when a high computing load is experienced by the edge server 110, the computing load may be distributed among several or all of the physical cores 120 and their respective computing cores 122. Conversely, when a low or modest computing load is experienced by the edge server 110, fewer physical cores 120 may be utilized and/or fewer respective computing cores 122 may be utilized to optimize power consumption.

The digital twin system 100 also includes a 5G core 128, which communicates with the edge server 110 via connection 126. The 5G core 128 is the heart of the 5G network utilized in the digital twin system 100 and is configured to control data communicated via 5G using 5G cells 104. The 5G core 128 is responsible for a variety of functions within the mobile network that makes wireless communication possible. In some embodiments, the 5G core 128 may be configured to run authentication, authorization, and data and policy management services of the local 5G network.

The digital twin implementation 114 includes one or more digital twins 116 stored in memory and updated to digitally reflect physical counterparts 102. In an illustrative example, the physical counterparts 102 may include an industrial device or system of devices. Each of the industrial devices or systems could be modeled using one or more parameters, including physical parameters and/or detectable state parameters. In a more specific illustrative example, the physical counterparts 102 may include robotic systems used in a manufacturing plant, and the status, performance, and operation of the robotic systems may be measured by parameters such as internal and/or external temperatures, robotic component positioning, running time, motor speed, and more. Each of the parameters may be measured by sensors or determined based on other parameters. For example, while direct sensor data may be obtained to determine a physical parameter of a physical counterpart, other parameters may be determined based on calculations involving one or more other physical parameters. The digital twins 116 thus digitally represent the physical counterparts 102 by modeling the physical counterparts 102 and accounting for parameters as measured and/or updated within the edge server 110. A user is thus able to make many useful determinations about a physical counterpart based only on information or predictions provided by a digital twin 116.

The physical counterparts 102 communicate with the edge server 110 either via wired or wireless communication, thereby providing update data to the digital twins 116. In the illustrated embodiment, physical counterparts 102 communicate using a 5G protocol, thereby communicating data wirelessly with 5G cells 104. The 5G cells are configured to communicate digitally with edge server 110 via a connection 106, which may include a direct and local wired connection to edge server 110 or a series of wired and/or wireless connections to the edge server 110.

As digital twins have a wide range of applications and types of operations, there are enhanced possibilities to optimize their application parameters from the networking perspective to be deployed more energy-efficiently. To begin with, as explained above, digital twins create and update a digital model of their real counterpart. Thus, the digital model precision depends on the amount of data from the digital twin sensors to update the model. It is particularly advantageous if the sensor data rate is configurable. The more frequently data is received from the physical object's sensor, the more accurate the model representation in the digital twin will be. However, a trade-off arises in that using more data to update the model comes with an increased computing and networking resource utilization, which may negatively affect the digital twin update process by introducing delay. In fact, the relationship between the amount of data used and the digital twin model might not be linear, for example it might follow an exponential curve where the model precision dramatically improves the more data that is used, but can slow down quite fast when already a large amount of data is used. Therefore, when already using a large amount of data to update the digital twin model, the model update operation delay does not compensate for the increase in the model precision. Furthermore, using a large amount of data consumes many radio resources, as more data has to be sent to the digital twin. In the embodiment illustrated in FIG. 1, for example, a large amount of data may consume a high degree of 5G bandwidth of 5G cells 104. Advantageously, digital twins can control the amount of data they are collecting from the physical counterpart by either polling them less frequently or requesting the physical object to send data less often. Moreover, in some cases, it is possible to configure the data rate per sensor to increase the data rate in sensors that carry more critical data for the model than others.

As digital twins are applied for many applications, including industrial applications, it can be advantageous to deploy digital twins and their physical counterparts using a local 5G network. Therefore, it is also possible to optimize the radio resources, such as the airtime (e.g., the number of physical resource blocks a user is allowed to use) and a modulation coding scheme. Reducing the airtime can have different effects such as increasing the transmission delay as fewer resources are available to transmit data, and consuming less energy because fewer resources are used. Depending on the requirements of the digital twin, it is possible to use part of its delay tolerance budget to slow down the data transmission and save energy on the radio part. The modulation coding scheme can also be optimized from the application perspective. Lower modulation coding schemes consume more power because they need to use more resource blocks to send the same data. However, when a base station is under high load, it is the opposite, as higher modulation coding schemes can consume more computational resources as the decoding becomes more complex.

Improved allocation of computational resources can therefore also lead to reduced energy consumption. Also, not isolating computational resources can lead to the so-called noisy neighbor effect, where deployed digital twins overuse resources due to interfering with each other. The contention for shared resources such as cache memory, which is critical for latency-sensitive processes, leads to increased computational resource usage, thereby increasing the overall energy consumption. Further, not isolating computational resources can also increase computing times, which results in fewer opportunities to use digital twin time budgets to save energy in different locations of a system.

The most common mechanisms to mitigate the so-called noisy neighbor problem on the cache memory focuses on partitioning its resources. There are two main tools to partition cache resources per process: (i) setting the core sets (also referred to as CPU pinning) such that certain processes are bound to a specific core or range of cores of a CPU; and (ii) using tools such as INTEL® Cache Allocation Technology (CAT) to allocate different cache memory portions. Processors are known to include a hierarchy of caches to reduce time and/or energy costs associated with accessing data stored in memory. Accordingly, reference is made hereafter to individual cache levels of a processor using such a hierarchy. In particular a level 1 (L1) cache is understood to be a first level in the cache hierarchy and closer to a processing unit than a level 2 (L2) cache, and so on.

Setting the core sets allows separation of L1 and L2 caches from different processes. Using tools like INTEL® Cache Allocation Technology allows for allocation of L3 cache resources to each process. However, these common mechanisms have technical limitations and shortcomings. On the one hand, very few central processing units (CPUs) support cache partition methods or tools such as INTEL® Cache Allocation Technology. Moreover, when allocating different L3 cache memory sizes to different process, it is possible to mitigate the number of cache misses, but this ability is limited as the cache allocated size is less than the total available cache size, as it has to be shared. On the other hand, setting different cores per process can be a problem in central processing units with a small number of cores, because setting completely separated central processing unit sets can exhaust available cores quickly. Finally, placing processes in different hosts also mitigates the effect of the so-called noisy neighbor problem, but at a higher cost in terms of computational resources.

One particular technical challenge in implementing digital twins is the strict deadline to keep syncing states of physical counterparts in real time. Whenever a digital twin violates its time deadline repeatedly, it loses synchronization with its real counterpart and has to synchronize with it again. In other words, such digital twins are inelastic and won't adapt to a computational resource deficit by slowing down task computation. However, as different digital twins perform different operation types at different time scales, the delay budgets of the different digital twins deployed have different values. Therefore, as there is no benefit in meeting the delay budget as soon as possible, it is possible to optimize radio communication and computing, which directly influence the delay experienced by a digital twin to optimize the system's energy consumption. On the one hand, the available radio resources affect the latency a digital twin will experience when transmitting and receiving data. Using more radio or wireless communication resources leads to faster transmission and reception times at the expense of using more energy. On the other hand, computing resources directly affect the total computing time. If the computing resources are not correctly allocated and isolated, a digital twin can experience considerable delays due to the so-called noisy neighbor effect if there are other interfering digital twins or there is a shortage of available computing time. Finally, digital twin configuration parameters, such as the amount of data received by sensors, set traffic and computing demands. In some cases, a digital twin using a large amount of data might push a system into increasing its power consumption with minimal benefit, as the relationship between the amount of data and the model's precision might not be linear.

In the system of FIG. 1, action configurations of the different digital twins are considered as they can impact each other. As the digital twins are deployed into the same shared pool of computational resources, an embodiment of the present invention jointly optimizes the different actions in the digital twin configurations, and computational and radio or wireless communication resources. If not considered together, it would be more difficult to tailor the number of resources to the system's demands, leading to increased energy consumption due to the contention of different digital twins accessing a shared pool of resources.

Given a scenario involving a fixed number of digital twins deployed into a common infrastructure, which control several physical objects through 5G with different operation tasks, it is technically challenging to adapt the digital twin configurations jointly with the respective radio and computational resource allocation to optimize the system's energy consumption. As meeting the latency constraints as fast as possible does not bring any benefit, it is possible to use the delay budget of each digital twin to optimize the system's energy consumption. Therefore, radio and computing resources are optimized jointly with each digital twin configuration as they directly affect the delay budget of each digital twin deployed and the quality of the results. An embodiment of the present invention provides a controller which ensures the delay budget of the different digital twins deployed in the network is considered to optimize energy consumption. The controller considers optimizing the different digital twins jointly rather than individually, leading to more effective decisions and actions, as it advantageously considers the coupled contention effects between the digital twins.

Embodiments of the present invention are applicable to more than just a scenario with several digital twins deployed into an edge-computing platform, such as the particular example illustrated in FIG. 1. For example, embodiments of the present invention can also be applied to an Internet of Things (IoT) scenario where different IoT applications run in real-time using data from different sensors.

Figure 2:
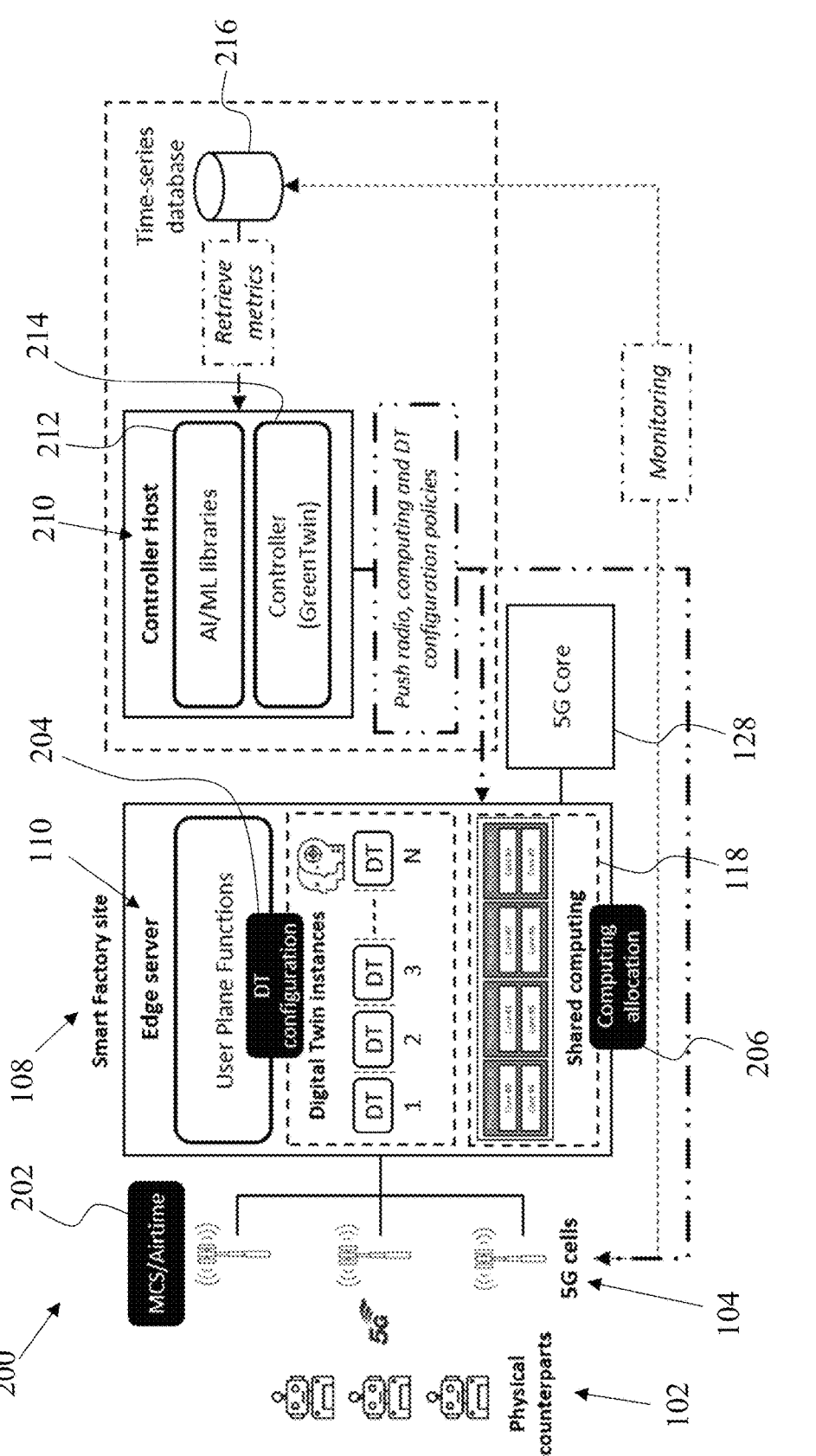
FIG. 2 illustrates a method and system for controlling digital twins in a smart factory according to an embodiment of the present invention.

In an embodiment, the present invention provides a controller for industrial digital twin applications that optimizes energy consumption through different actions in radio, computing, and digital twin configurations. As shown in FIG. 2, which illustrates a digital twin control system 200, an embodiment of the present invention can be practically applied in a scenario where multiple virtualized digital twin application instances $DT_{1,2,3 \ldots N}$ 116 are deployed over an edge-computing platform providing services to a local 5G network. These digital twins 116 perform different operations, in particular monitoring, simulation or control, over their related physical counterparts 102 (e.g., robots, autonomous vehicles, drones etc.) using a local 5G network (e.g., 5G cells 104, operated by 5G core 128) to communicate. The digital twins 116 combine newly received data with historical data to perform their operations.

Depending on the current needs of each application and the industrial workloads (e.g., more or less robots working in parallel), the controller according to an embodiment of the present invention, which may also be referred to herein as "GreenTwin") will dynamically adjust the configuration parameters of each digital twin instance, jointly with computing and radio policies to optimize the system energy consumption and delay budgets.

The scenario of FIG. 2 is comprised of two main parts: 1) an edge host or edge server 110, where it is possible to deploy the virtualized digital twin instances; and 2) a separate host, such as a controller host 210 where the controller 214 runs. The edge host 110 also hosts the user plane function 112, which forwards traffic to the different digital twins 116 deployed enabling 5G data plane communication. Each digital twin instance 116 performs different operations over the physical counterparts 102, such as monitoring, simulation, or control. Digital twins 116 are preferably deployed using containers as they are lightweight and easy to manage. Container managers enable the creation, removal and allocation of resources to a container dynamically. In particular, a provider or creator of a digital twin 116 can provide a set of container images with different functionalities using a container manager such as Docker Swarm or Kubernetes to handle operations. The diverse operations digital twins 116 carry out pose different latency budgets for each digital twin 116. The controller 214 leverages the latency budget of the different digital twins 116 to optimize the energy consumption. The edge-computing host includes a metrics agent, which gathers different metrics from the digital twins deployed and the computing resources. These metrics are saved into a metrics database 216 in a different location. The metrics database 216 may be a time-series database, which is a software system that is optimized for storing data ordered in time and associating values with times.

As illustrated in FIG. 2, the digital twin control system 200 is configured to optimize radio resources, such as a modulation coding scheme and/or airtime via a radio access network interface 202. The digital twin control system 200 is also configured to optimize use of computational resources via computing allocation interface 206 of a computing core network 118. Furthermore, the digital twin control system 200 is configured to optimize system performance through digital twin configuration interface 204, as the parameters and actions associated with digital twin monitoring, simulation, and operation can affect both computational and wireless communication resource requirements.

The digital twin control system 200 of FIG. 2 comprises a controller host 210. In the same host 210 where the controller 214 runs, there are also different artificial intelligence/machine learning (AI/ML) libraries 212 to support the operation of the controller 214. The controller 214 can reach edge host application processing interfaces (APIs). In some embodiments, for example:

The container manager interface allows it to manage and orchestrate the deployed containers. In detail, the controller 214 can retrieve information from each container running into the platform, and additionally the controller 214 can configure the central processing unit sets and processing time allocated to each digital twin. Configuration of the central processing unit sets and allocation of the processing time can be implemented by the controller 214 using container managers (such as Docker Swarm or Kubernetes, as described above) which include such configuration and allocation functionalities for containers. Alternatively, configuration and allocation can be carried out using Linux control groups (known as cgroups) in the absence of a container manager.

The digital twin configuration interfaces 204 change digital twin configuration parameters. This also allows an artificial intelligence-enabled controller 214 to retrieve information about the digital twin such as, how many sensors are active and the type of operations being performed.

An interface, such as the computing allocation interface 206, is configured to control the L3 cache allocation (e.g., using INTEL® Cache Allocation Technology).

The controller 214 can also reach a radio access network interface 202, which allows changing the airtime and modulation coding scheme configuration for the radio access points used to run the system 200. In an embodiment, the controller 214 runs in discrete time intervals that can be regarded as decision intervals. At the beginning of each decision interval, the context of each deployed digital twin is input to the controller and the corresponding computational resource allocation is output, along with radio policies and digital twin configuration to optimize the energy consumption while meeting digital twin latency budget constraints. The controller 214 can fetch different metrics from the metrics database 216, which stores all the measurement data collected from the edge host computing platform's metrics agent. The controller 214 learns the latent relationship between the context, actions and energy to optimize the system actions.

In the following exemplary embodiments, context, action and reward functions are further detailed, and the architecture of the controller 214 is further described.

With respect to context information, the context information of each digital twin is formatted, in particular, for each sensor in the physical object, and a vector is created with the following information:

Sensor type: The type of information being gathered. The sensor type is encoded using a one-hot vector (e.g., a vector with a single high value and with all remaining values being low) depending on the different types of sensors that exist across the different digital twins.

Sensor bitrate: The rate at which the sensor is sending the data. This can be measured from the rate of data flows received at the input of the digital twin.

Sensor active: Whether the sensor is active or not.

Also, a one-hot encoded vector is created with the type of digital twin, and is concatenated with the value of the latency budget of the digital twin. As different physical objects can have a different number of sensors, the previously listed vectors are embedded for each digital twin into a fixed length vector using relation networks. Further details are provided below for the different functional blocks of the artificial intelligence-enabled controller.

With respect to actions, the controller can take different actions in the system. These actions include deciding which sensor will be active and the sampling frequency of the sensors (e.g., sensors of a robot). As explained above, the simulation model precision depends on the number of active sensors and the amount of data a digital twin receives and uses to update its physical object model. In addition, for operational digital twins the command rate controls the number of steps of a task. For instance, moving a robotic arm ten centimeters can be done in ten steps of one centimeter per step, five steps of two centimeters per step, or one step of ten centimeters, among other options. However, every time a step is performed, the digital twin has to update the simulation model. Therefore, finer-grained control poses a higher computational load.

In summary, the actions the artificial intelligence-enabled controller can take on the digital twin configurations by changing of sensor sampling frequency, changing of command rate, and/or activation or deactivation of different sensors.

The controller can control the computing cores and the number of L3 cache lines allocated to each digital twin. This can be done using a container manager and a tool to allocate cache lines such as INTEL® Cache Allocation Technology. Thus, the actions of the controller over the computing include changing the computing sets and changing the number of L3 cache lines assigned to each digital twin deployed.

It is especially advantageous to correctly allocate the computing sets and the L3 cache lines as these directly influence the available computing time and address the so-called noisy neighbor effect. This affects directly the delay budget of each digital twin and energy consumption.

Finally, it is possible to tune the airtime, in particular the number of physical resource blocks allocated to a user, and the modulation coding scheme, which directly affects the energy consumption and latency budget of the digital twins deployed. Therefore, the actions of the controller over the radio include changing the airtime policy of a user, and changing the modulation coding scheme policy.

The controller uses a global feedback signal to optimize system energy consumption while ensuring that the digital twins can correctly perform their operations. The global feedback signal may be the total energy consumption of a system during a decision interval that is normalized between a value of −1 and 0. Thus, the less energy consumed while the digital twins correctly meet their latency constraints, the better feedback the controller will receive. However if any digital twins cannot perform their operations correctly due to non-optimal actions, the controller will receive a negative feedback signal, which discourages it to use that set of actions in future decision intervals. Specifically, because digital twins may be inelastic, if a digital twin does not function correctly due to actions taken by the controller, the global feedback signal will have a value of −1 to discourage actions that would result in malfunction of a digital twin. The feedback signal can have different expressions if it captures the tradeoff between energy consumption and correct digital twin operation. Relevant metrics used to build the reward function can be collected by metrics agents, which collect the following information from each digital twin instance and the infrastructure:

Computing time (in ms) and computing usage (as a percentage of the total computing time available).

Command rate, command round-trip time and command lost rate (if the digital twin is sending commands to control its physical counterpart).

Edge server energy consumption.

Figure 3:
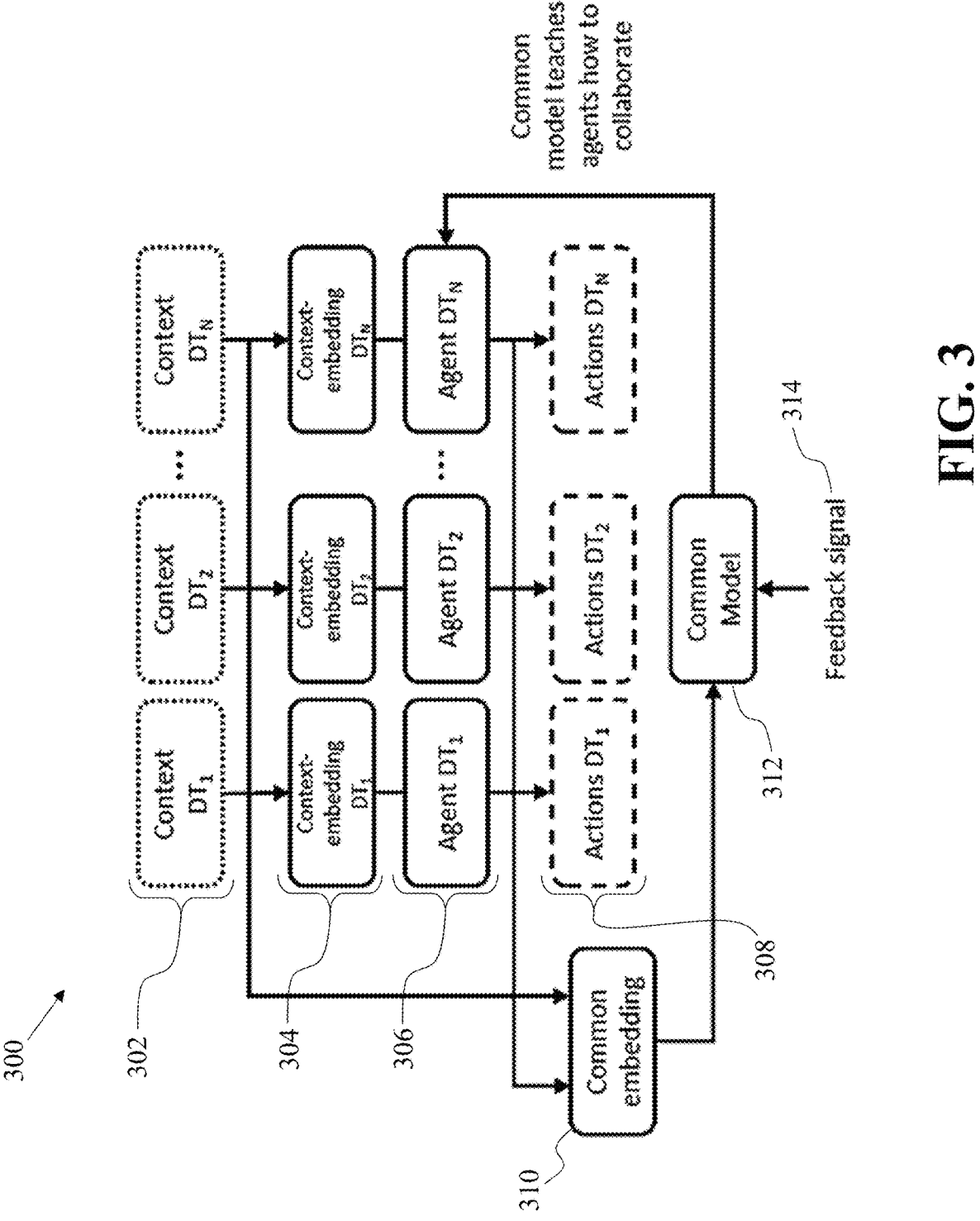
FIG. 3 illustrates the different functional blocks of a controller according to an embodiment of the present invention.

FIG. 3 shows a functional block diagram 300 with different functional blocks of a controller according to an embodiment of the present invention, such as the controller 214 of FIG. 2. Each of the functional blocks in the functional block diagram 300 represents a different software-implemented function that may be carried out by the controller.

The controller is comprised of different agents 306 which map to different digital twins deployed into the edge-computing server. Each digital twin agent 306 chooses the actions 308 of a digital twin deployed in the network from the available set of actions using the context information 302 of its digital twin as input. The context information 302 and actions 308 chosen are then embedded using a common embedding function 310 and passed to a common model 312. Embedding of the context information 302 can be performed using a neural network function such as a relation network. The relation network may take all possible combinations of two vectors as an input, each time outputting a vector in having different dimensions. After all possible combinations of two vectors have been input, the various outputs can be aggregated. As a result, a variable length input can be represented in a fixed dimensional space. The common model 312 is a computer program that is trained to recognize patterns and/or make predictions based on input data. The common model uses the common feedback signal 314 described above to refine the model and teach the different agents how to collaborate to optimize the system's energy consumption. For example, an Actor-Critic method may be utilized for reinforcement learning. In such an approach, each of the agents 306 are mapped to a different actor with a common critic. The critic is trained using the common feedback signal 314 and the agents 306 are trained using input context and the output of the critic. As different physical objects can have a different number of sensors and types of sensors, the input context of the different digital twins is embedded into a common space (e.g. using a relation network) at each agents' 306 input in order to embed variable context information 302 for each digital twin into a fixed-length vector. The context embedding blocks 304 are trained along with the agents 306. That is, because each context embedding block 304 is considered as part of its respective agent 306, context embedding blocks 304 and agents 306 will be trained at the same time.

Each agent 306 will have different digital twin configuration action sets 308 depending on the type of digital twin it is mapping to. However, the action set 308 on the computing and the radio resources are the same for every agent 306. In another embodiment of the present invention, the set of actions 308 are constrained on the computing and radio resource for each digital twin. For example, in a case there is an insight on how a digital twin is implemented in terms of the number of maximum threads that will be running, it is possible to constrain the maximum number of computing cores available. For instance, if a digital twin is implemented with three threads, there is no benefit to using four computing cores or more as they will not leverage all the available cores. The same logic can be applied to the airtime radio policy. If the maximum bit rate achievable using all the sensors of a physical object meets a specific number of resource blocks, there is no benefit to allocating more than those resource blocks. Therefore, it is possible to constrain the maximum airtime value. Constraining the action set 308 to fewer actions allows for faster training of the controller.

Next, once all the agents compute the different actions 308 per digital twin, the common model 312 and common feedback signal 314 are used to teach the different digital twins how to collaborate. A common embedding function 310 is used to embed the different actions 308 and contexts 302 of the different agents so that they learn how the other agents' 306 actions impact their actions. This improves convergence and teaches the agents how to collaborate. The common model is trained using the feedback signal function 314, which captures the tradeoff between the system energy consumption and the latency budget of the different digital twins.

In another embodiment of the present invention, there are multiple computing platforms either at the edge server or in the cloud. Placing different digital twins in different computing platforms also contributes to optimizing energy consumption. This is particularly advantageous where it is not possible to allocate L3 cache lines and the so-called noisy neighbor problem exists, and/or if there are a large number of digital twins, which cannot be all deployed into the same computing server. If there is a set of hosts that can be used, an embodiment of the present invention can be extended to decide the placement of the different digital twins.

Embodiments of the present invention enable the following improvements over existing technology:

1. Providing a controller (GreenTwin) composed of multiple agents which map to different digital twins deployed in an edge-computing server using 5G to communicate with their real counterparts. The controller is configured to decide the joint computational and radio resource allocation along with the digital twin configurations to minimize the energy consumption of the platform. The controller continuously runs in different decision intervals. This advantageously
   a. The controller optimizes jointly the computing core sets and the L3 cache lines, the airtime and modulation coding scheme with the sampling frequency of the sensors of the physical objects to minimize the energy consumption.
   b. The controller uses different contextual metrics from the different digital twins deployed as the main input to optimize the energy consumption while meeting the latency deadlines. In detail, the controller uses the information on the sensor type, sensor bit rate and sensor active metrics from each digital twin as the main input for the different agents to compute the actions of the different digital twins.
   c. The controller embeds the context information and actions of the different agents using a common embedding block which in combination with a common feedback signal is used to train a common model. The common model is used to teach the different agents to collaborate. This helps the different agents to understand how its actions affect other digital twins.
   d. The different agents which map to each of the digital twins deployed into the system learn how to optimize the system energy consumption collaborating between them owing to the common model trained using the common feedback signal.
2. Leveraging the delay budget of the different digital twins to optimize energy consumption. In particular, energy consumption is optimized from the point of view of the application. This is particularly advantageous in physical systems such as a smart factory where energy consumption may hinder the large-scale deployment of digital twin applications. Embodiments of the present invention also optimize the energy consumption when several digital twins are deployed in the same infrastructure.

In an embodiment, the present invention provides a method for controlling digital twins comprising the following steps:

1. At the beginning of a decision interval, the controller fetches the input metrics for each of the different agents. These includes the sensor type, sensor bit rate and sensor active metrics. The controller retrieves this from the metrics database where the metrics agent stores this information.
2. The contextual information is used to compute the optimal actions of the different previously listed parameters (computing, radio and digital twin configuration) to minimize the energy consumption while complying with the latency budget of the different digital twins deployed.
3. The radio, computing and digital twin configuration control application programming interfaces of the edge-host, base stations and digital twins are accessed. The controller has access to the following control operations:
   a. Updating the computing core set and the number of L3 cache lines.
   b. Updating the airtime and the modulation coding scheme for the different users.
   c. Updating the sampling frequency of the sensors of the physical objects the different digital twins are following.
4. At the end of the decision interval, the controller uses the feedback signal to train a common model across the agents which teach them how to collaborate to optimize the system energy consumption. Thus, the agents learn how to collaborate between one another.

Figure 4:
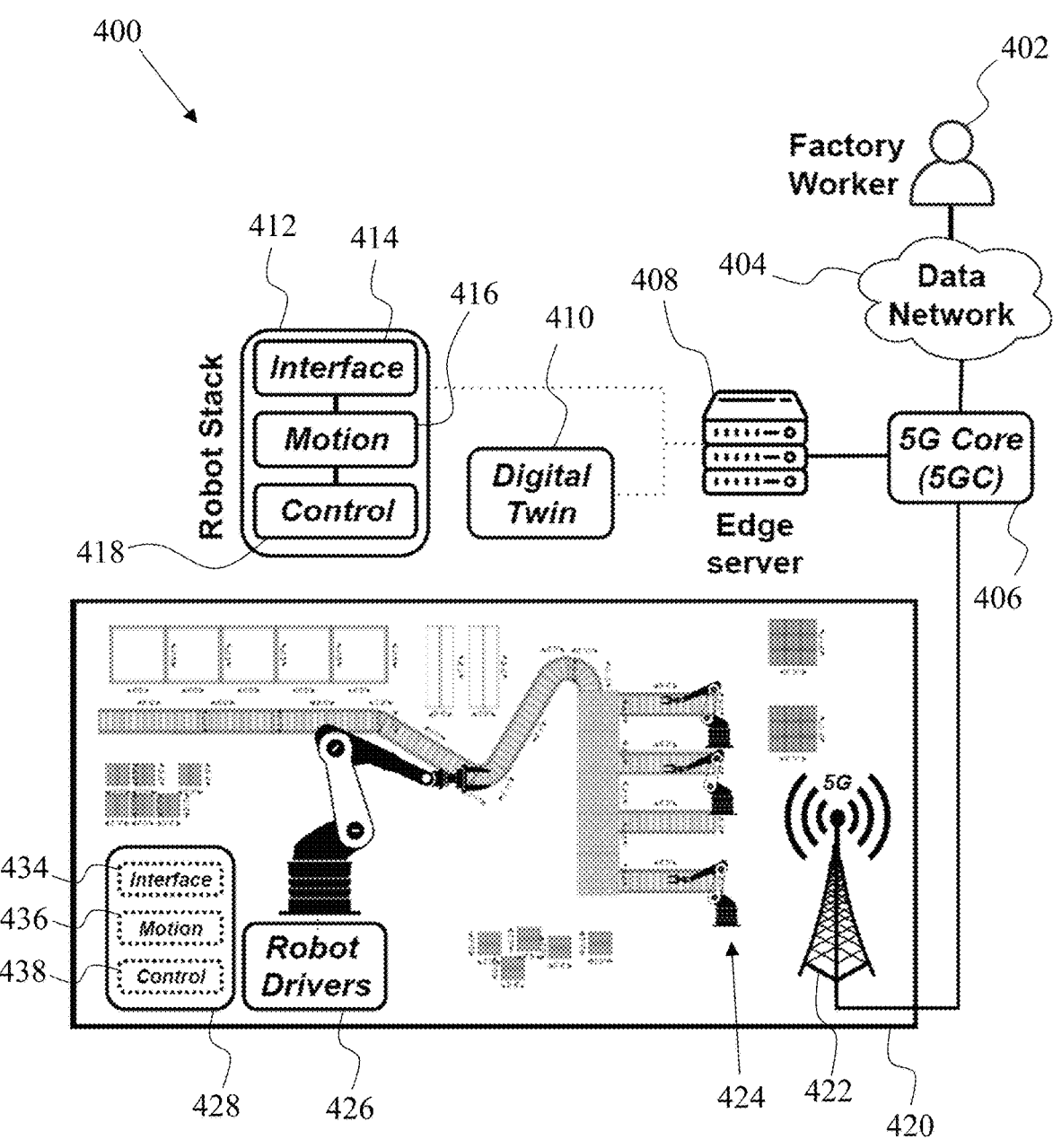
FIG. 4 illustrates an edge robotic digital twin service.

FIG. 4 illustrates an edge robotic digital twin service 400. In the illustrated service 400, an embodiment of the present invention is integrated with an assembly plant 420. A factory worker 402 accesses a data network 404 which is in communication with a 5G core 406. The 5G core 128 is the heart of the 5G network utilized in the digital twin service 400 and is configured to control data communicated via 5G cell 422. The 5G core is also in communication with edge server 408, which may be located on-site or remotely. A plurality of plant robots 424 within the assembly plant 420 are monitored via sensors configured to measure and/or detect parameters associated with the plant robots 424. The sensor data is communicated to edge server 408 via 5G cell 422 to update a digital twin 410. The 5G cell 422 is also used to send commands or parameter data from edge server 408 to plant robots 424. Each of the plant robots 424 is operated via one or more robot drives 426, which operates based on a robot stack 428. The robot stack 428 is a software stack that includes a collection of independent software components that work together to support execution of robot operations. The robot stack 428 includes an interface function 434, a motion function 436, and a control function 438 for carrying out various respective functions that together allow operation of the plant robot 424 as intended in an assembly operation. It will be readily appreciated that additional functions can be included in robot stack 428, and that the particular functions shown in FIG. 4 are illustrative only.

The edge server 408 includes memory with a stored instance of one or more digital twins 410. The digital twin 410 is a virtual or digital representation of a plant robot 424, and can thus be used to predict parameters of the plant robot 424. The digital twin 410 like its physical plant robot counterpart 424, is modeled to incorporate a digital twin robot stack 418. The digital twin robot stack 418, like the plant robot stack 428, includes an interface function 414, a motion function 416, and a control function 418. The digital twin 410 thus includes a robot stack 412 that mirrors that of a physical counterpart plant robot 424 to ensure a more complete and accurate model for predicting robot parameters can be trained using digital twin 410.

It will be readily understood that although FIG. 4 illustrates a particular digital twin service 400 implemented in an assembly plant, that a variety of similar or related applications of embodiments of the present invention may be realized in different settings, industries, and/or applications. For example, a comparable digital twin service may be implemented in a water treatment plant where digital twins represent physical monitoring systems as opposed to robots. Digital twins may also be implemented within the context of embodiments of the present invention in medical applications, such as monitoring and/or control of medical devices and associated sensors.

Figure 5:
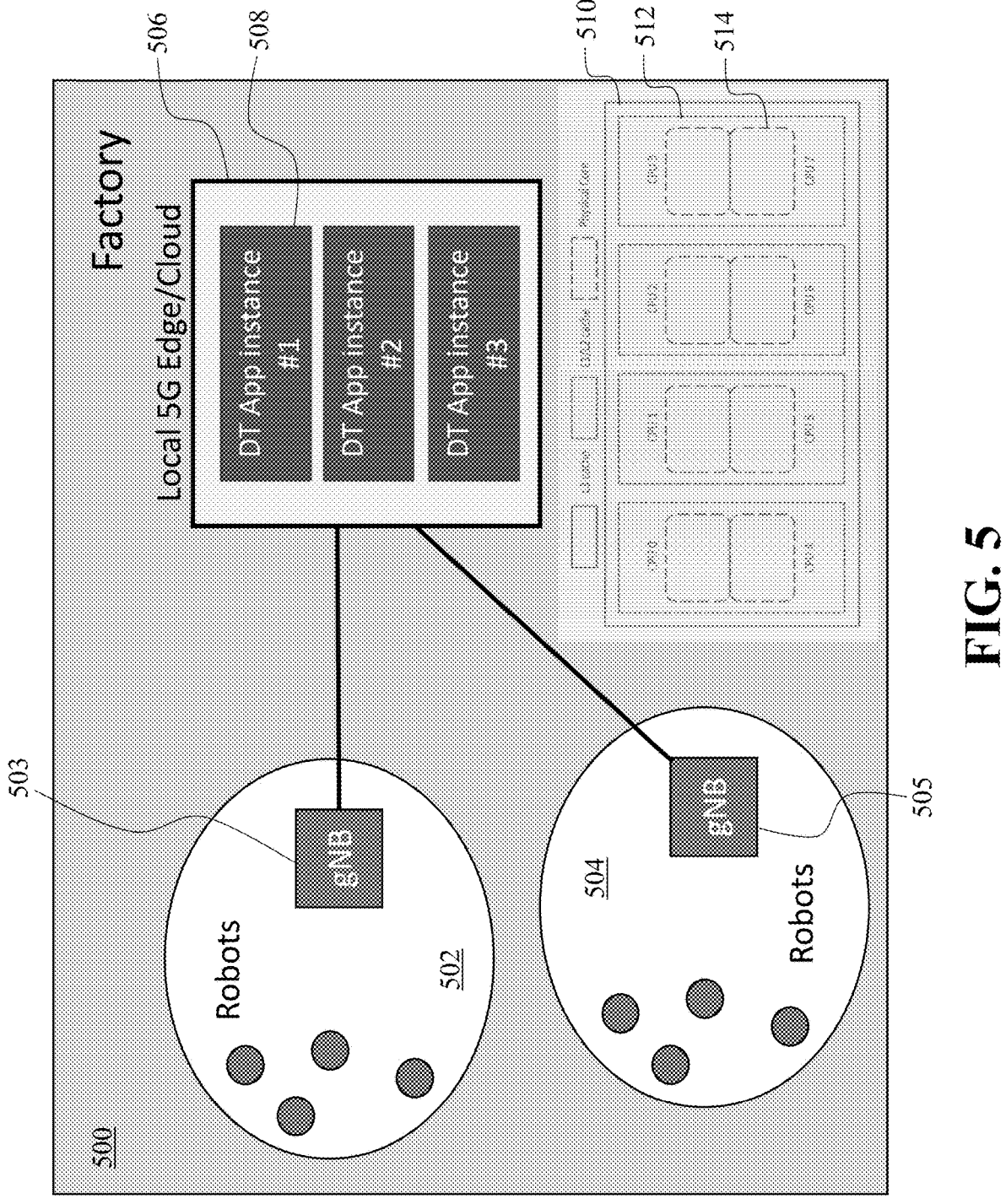
FIG. 5 illustrates an industrial digital twin scenario.

FIG. 5 illustrates an industry digital twin scenario. Specifically, a factory floor 500 is illustrated and includes a first group of robots 502 and a second group of robots 504. Each group of robots 502, 504 is in communication with a base station 503, 505, which is also in communication with a computing platform 506 that is also included in the factory floor 500. The base stations 503, 505 may be wireless base stations for transmitting and receiving communication. In the illustrated embodiment, base stations 503, 505 comprise gNodeB (gNB) 5G wireless base stations. The computing platform 506 may include, for example, a local 5G edge server or a cloud-based computing platform. The computing platform 506 includes a plurality of digital twin instances 508 implemented in software and stored in memory of the computing platform 506. The computing platform 506 includes a plurality of physical computing cores 514 that may be used by computing platform 506 to carry out computational tasks associated with processing data received from the base stations 503, 505 and updating the digital twin instances 508. Computational tasks are allocated among separate physical cores 514. Computational tasks are also allocated among L1/L2 caches 512 and L3 caches 510. Although the embodiment illustrated in FIG. 5 includes only one L3 cache 510, it will be readily understood that additional L3 caches (and, as a consequence, additional L1/L2 caches and physical cores) may be included in the computing platform 506.

Figure 6:
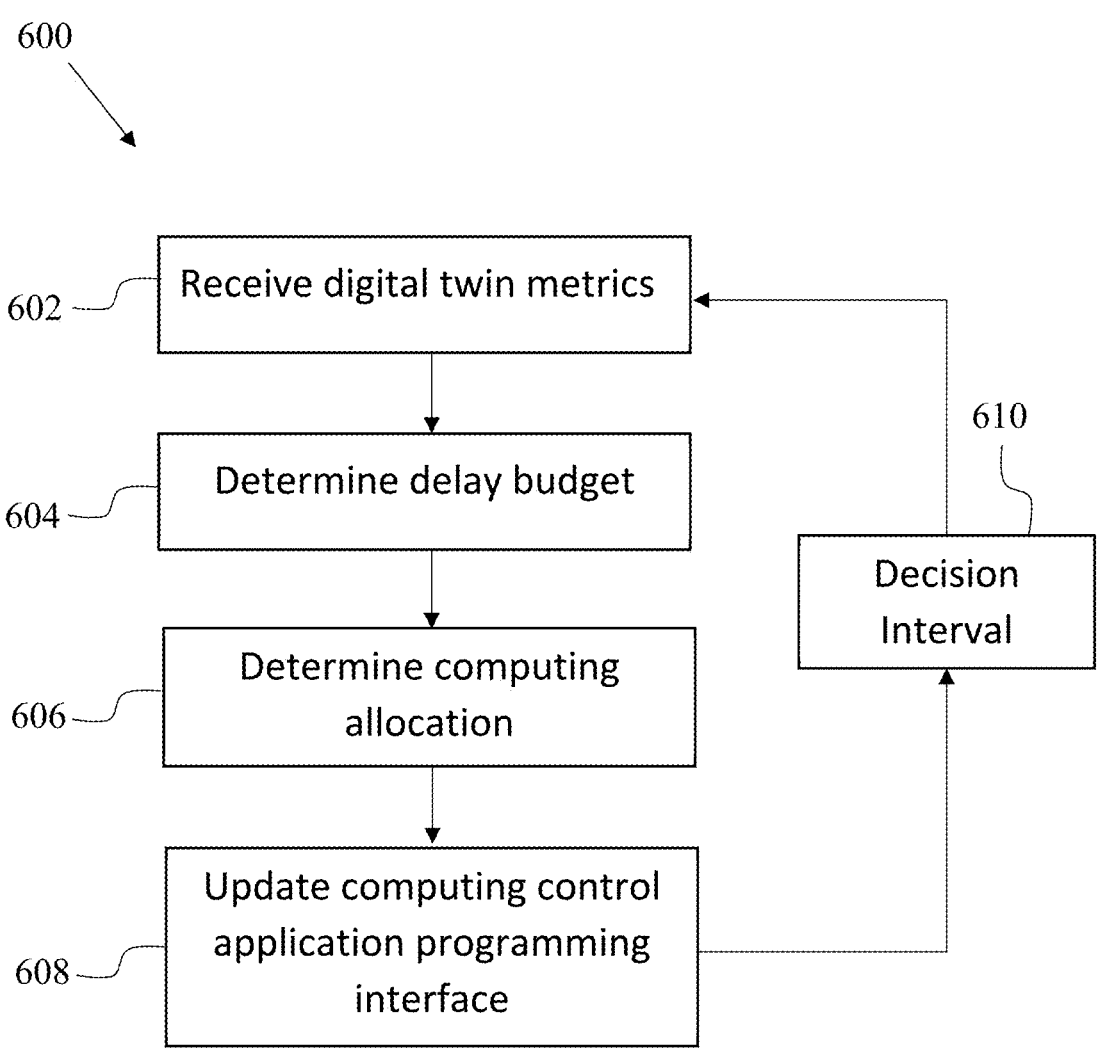
FIG. 6 illustrates a flowchart showing steps of a method for optimizing power consumption in a digital twin system.

FIG. 6 illustrates a method 600 for optimizing energy consumption of a digital twin system, according to an embodiment of the present invention. The method includes receiving a plurality of metrics 602 regarding each of a plurality of digital twins implemented in a digital twin system. A delay budget determination 604 is made for each of the plurality of digital twins. A computing allocation determination 606 is made based on the plurality of metrics received in step 602 and the delay budget determined in step 604. The computing allocation defines which of a plurality of processors are utilized to process data for each of the plurality of digital twins implemented in the digital twin system. As described above, the computing allocation is also configured to reduce power consumed by the plurality of processors, as the computing allocation can balance the need to process digital twin data against the delay budgets, thereby avoiding intensive processing when it is unnecessary to maintain digital twin operability. A computing control application programming interface is updated in step 608 to control which of a plurality of processors in the digital twin system are utilized to process data for the plurality of digital twins.

The method 600 can be performed over a discrete decision interval 610, which is a predetermined time interval that may be repeated to ensure the method 600 is likewise repeated. By performing the method 600 iteratively over repeated and discrete decision intervals 610, continual and optimal control of the plurality of processors in the digital twin system is ensured, thereby also ensuring that computational resources are optimally used based on frequently re-analyzed digital twin metrics. It will be readily understood that by providing reducing the length of a decision interval 610, computing resource allocation may be more finely tuned according to the digital twin metrics. That is, if the decision interval is show and the method 600 is repeated with greater frequency in a given period of time, an increase in computational resource optimization may be achieved.

Figure 7:
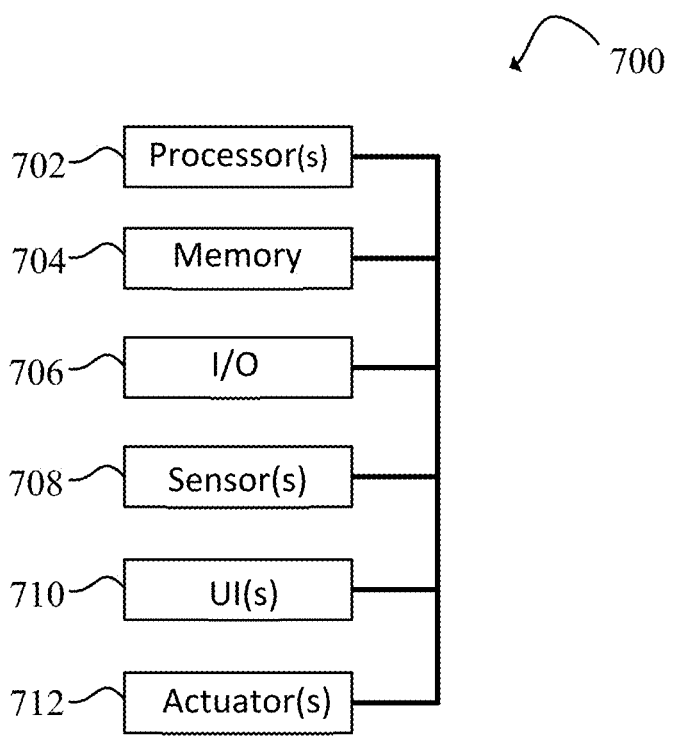
FIG. 7 is a block diagram of an exemplary processing system, which can be configured to perform any and all operations disclosed herein.

Referring to FIG. 7, a processing system 700 can include one or more processors 702, memory 704, one or more input/output devices 706, one or more sensors 708, one or more user interfaces 710, and one or more actuators 712. Processing system 700 can be representative of each computing system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 700 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USB®, Display- Port®, HDMI®, Ethernet, and the like. Input-output devices 706 can enable electronic, optical, magnetic, and holographic, communication with suitable memory 706. Input-output devices 706 can enable wireless communication via WiFi®, Bluetooth®, cellular (e.g., LTE®, CDMA®, GSM®, WiMax®, NFC®), GPS, and the like. Input-output devices 706 can include wired and/or wireless communication pathways. In some embodiments, input-output devices 706 can include 5G cells for facilitating 5G wireless communication between physical counterparts of digital twins and a controller host, or between physical counterparts and a one or more edge servers implementing digital twin instances.

Sensors 708 can capture physical measurements of environment and report the same to processors 702. In some embodiments, sensors 708 may include cameras, position sensors, and/or other types of sensors for monitoring parameters of a physical counterpart of a digital twin. User interface 710 can include displays, physical buttons, speakers, microphones, keyboards, and the like. Actuators 712 can enable processors 702 to control mechanical forces. For example, in some embodiments, actuators 712 may be motors for controlling a robot or a robotic arm in a factory.

Processing system 700 can be distributed. For example, some components of processing system 700 can reside in a remote hosted network service (e.g., a cloud computing environment) while other components of processing system 700 can reside in a local computing system. In some embodiments, some components of processing system 700 can reside in a local edge server of a factory or in a cloud computing environment within service latency requirements. Processing system 700 can have a modular design where certain modules include a plurality of the features/functions shown in FIG. 7. For example, I/O modules can include volatile memory and one or more processors. As another example, individual processor modules can include read-only-memory and/or local caches.

The following references are hereby incorporated by reference herein:

M. Groshev, C. Guimarães, A. De La Oliva and R. Gazda, "Dissecting the Impact of Information and Communication Technologies on Digital Twins as a Service," IEEE Access, vol. 9, pp. 102862-102876, doi: 10.1109/ACCESS.2021.3098109 (2021).

L. Girletti, M. Groshev, C. Guimarães, C. J. Bernardos and A. de la Oliva, "An Intelligent Edge-based Digital Twin for Robotics," 2020 IEEE Globecom Workshops, pp. 1-6, doi: 10.1109/GCWkshps50303.2020.9367549 (2020).

In contrast to the foregoing references, embodiments of the present invention provide improvements for offloading computation and intelligence from robots to a network. For example, configuration of the radio access network (RAN) is leveraged to decrease system energy consumption in comparison to known systems.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for optimizing energy consumption of a digital twin system, the method comprising:

receiving a plurality of input metrics for each of a plurality of digital twins implemented in the digital twin system, the input metrics including sensor data from a plurality of corresponding physical counterparts of the digital twins;

determining, simultaneously, an updated configuration for each of the plurality of digital twins and an updated resource allocation for computational and radio resources allocated to each of the plurality of digital twins based on context information of the digital twins, each updated configuration including at least one of an updated radio configuration, computing configuration, and digital twin configuration that reduces a power consumption of the digital twin system; and providing each updated configuration to at least one of a radio application programming interface (API), computing API, and digital twin configuration API, wherein the plurality of input metrics are received by a plurality of agents, wherein each agent is associated with a different digital twin, and wherein each agent jointly determines:

the updated configuration for each of the plurality of digital twins based on the context information of the digital twins, wherein the updated configuration includes a sampling frequency, command rate, and activation status of a sensor of each of the plurality of physical counterparts that reduces a power consumption of the digital twin system;

required radio resources for each of the plurality of digital twins to connect to corresponding physical counterparts based on the context information of the digital twins;

required computational resources for each of the plurality of digital twins at an edge server for implementing the updated configuration for each of the plurality of digital twins based on the context information of the digital twins; and optimum placement of different digital twins in different hosts based on the context information of the digital twins to meet a delay budget for each of the plurality of physical counterparts corresponding to the plurality of digital twins.

2. The method of claim 1, further comprising training a common model with a feedback signal, wherein the feedback signal indicates the power consumption of the digital twin system and whether a delay budget for each of the plurality of physical counterparts corresponding to the plurality of digital twins is met or exceeded.

3. The method of claim 2, wherein the delay budget corresponds to a latency period during which operation of a physical counterpart to a digital twin can be delayed.

4. The method of claim 2, wherein each agent is configured to determine actions of the digital twin with which the agent is associated and to provide the updated configuration to at least one of the radio API, the computing API, and the digital twin configuration API of the associated digital twin.

5. The method of claim 4, wherein each agent is configured to use the common model to determine the actions of its associated digital twin such that the agents learn to collaborate with each other.

6. The method according to claim 2, wherein the receiving of the plurality of input metrics occurs at the beginning of a decision interval and the feedback signal is used to train the common model at the end of the decision interval, and wherein each step of the method is repeated iteratively over a plurality of discrete decision intervals.

7. The method of claim 1, wherein determining the updated radio configuration includes determining at least one of a wireless transmission airtime of data from the plurality of physical counterparts to a wireless receiver and a modulation coding scheme that reduces the power consumption of the digital twin system.

8. The method of claim 1, wherein determining the updated computing configuration includes determining at least one of a computing core set allocation and L3 cache line allocation for each of the plurality of digital twins that reduces the power consumption of the digital twin system.

9. The method of claim 1, wherein the context information is determined using the input metrics and includes a vector indicating at least one of a sensor type, a sensor bitrate, a sensor activation status, a type of the respective digital twin, and a latency budget of the respective digital twin.

10. The method of claim 9, wherein the sensor data from the plurality of physical counterparts includes at least one of the sensor type, the sensor bit rate, and the sensor activation status, wherein the context information and actions of the digital twins are embedded using a common embedding function and used by a common model, and wherein the common model is used by each of the agents to determine the actions such that the agents learn to collaborate.

11. The method of claim 10, wherein the context information for each of the digital twins is embedded into a common embedding space to obtain variable context information for each of the digital twins in a fixed-length vector, and wherein the common model receives a common feedback signal for the digital twins.

12. The method of claim 1, wherein the radio API is configured to define parameters for a local 5G network, and wherein the plurality of digital twins and the plurality of physical counterparts are configured to communicate via the local 5G network.

13. The method of claim 1, further comprising providing each updated resource allocation to a controller associated with the digital twin system to meet the delay budget for each of the plurality of physical counterparts corresponding to the plurality of digital twins.

14. A controller for a digital twin system, the digital twin system including an edge server, wherein a plurality of digital twins are stored in a memory, the digital twins corresponding to digital models representing physical counterparts, and one or more wireless communication cells configured to receive sensor data from one or more sensors of each of the physical counterparts, the controller comprising one or more processors, which alone or in combination, are configured to provide for execution of the following steps:

receive a plurality of input metrics for each of the plurality of digital twins implemented in the digital twin system, the input metrics including sensor data from the physical counterparts of the digital twins, determine, simultaneously, an updated configuration for each of the plurality of digital twins and an updated resource allocation for computational and radio resources allocated to each of the plurality of digital twins based on context information of the digital twins, each updated configuration including at least one of an updated radio configuration, computing configuration, and digital twin configuration that reduces a power consumption of the digital twin system, and provide each updated configuration to at least one of a radio application programming interface (API), computing API, and digital twin configuration API, wherein the plurality of input metrics are received by a plurality of agents, wherein each agent is associated with a different digital twin, and wherein each agent jointly determines:

the updated configuration for each of the plurality of digital twins based on the context information of the digital twins, wherein the updated configuration includes a sampling frequency, command rate, and activation status of a sensor of each of the plurality of physical counterparts that reduces a power consumption of the digital twin system;

required radio resources for each of the plurality of digital twins to connect to corresponding physical counterparts based on the context information of the digital twins;

required computational resources for each of the plurality of digital twins at an edge server for implementing the updated configuration for each of the plurality of digital twins based on the context information of the digital twins; and optimum placement of different digital twins in different hosts based on the context information of the digital twins to meet a delay budget for each of the plurality of physical counterparts corresponding to the plurality of digital twins.

15. A non-transitory computer-readable medium having processor-executable instructions stored thereon, wherein the processor-executable instructions, when executed by one or more processors, facilitate performance of a method for optimizing energy consumption of a digital twin system, comprising:

receiving a plurality of input metrics for each of a plurality of digital twins implemented in the digital twin system, the input metrics including sensor data from a plurality of corresponding physical counterparts of the digital twins;

determining, simultaneously, an updated configuration for each of the plurality of digital twins and an updated resource allocation for computational and radio resources allocated to each of the plurality of digital twins based on context information of the digital twins, each updated configuration including at least one of an updated radio configuration, computing configuration, and digital twin configuration that reduces a power consumption of the digital twin system; and providing each updated configuration to at least one of a radio application programming interface (API), computing API, and digital twin configuration API, wherein the plurality of input metrics are received by a plurality of agents, wherein each agent is associated with a different digital twin, and wherein each agent jointly determines:

the updated configuration for each of the plurality of digital twins based on the context information of the digital twins, wherein the updated configuration includes a sampling frequency, command rate, and activation status of a sensor of each of the plurality of physical counterparts that reduces a power consumption of the digital twin system;

required radio resources for each of the plurality of digital twins to connect to corresponding physical counterparts based on the context information of the digital twins;

required computational resources for each of the plurality of digital twins at an edge server for implementing the updated configuration for each of the plurality of digital twins based on the context information of the digital twins; and optimum placement of different digital twins in different hosts based on the context information of the digital twins to meet a delay budget for each of the plurality of physical counterparts corresponding to the plurality of digital twins.

* * * * *